July 5, 1960  G. ORLOFF ET AL  2,943,819
AIRCRAFT UNDERCARRIAGE
Filed July 18, 1956  2 Sheets-Sheet 1
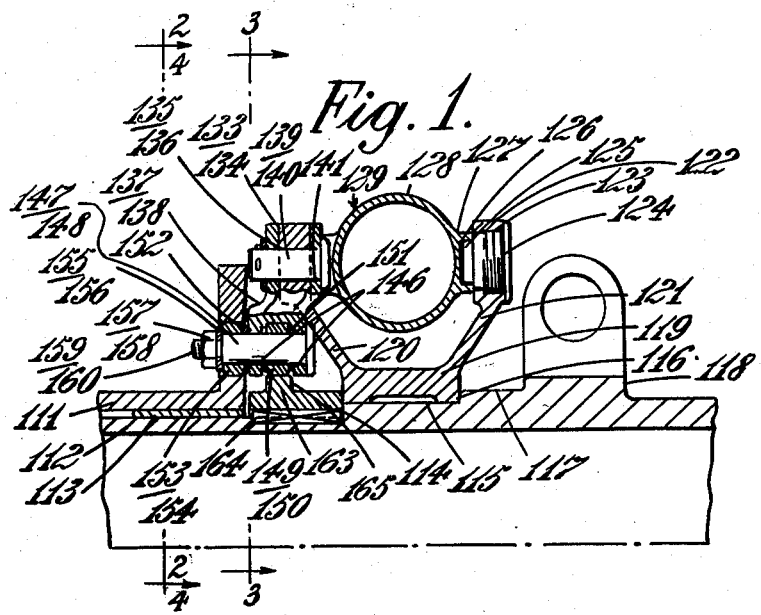
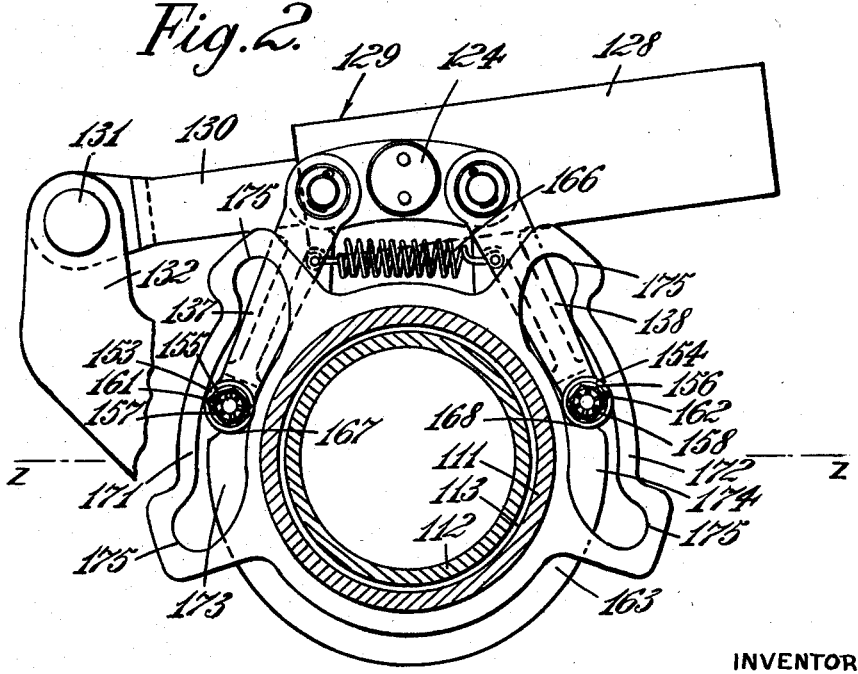
INVENTORS
GEORGE ORLOFF
ROBERT ROY
BERNARD E. COOPER
KENNETH T.P. LANGDON
By
*Watson, Cole, Grindle & Watson*
ATTORNEYS

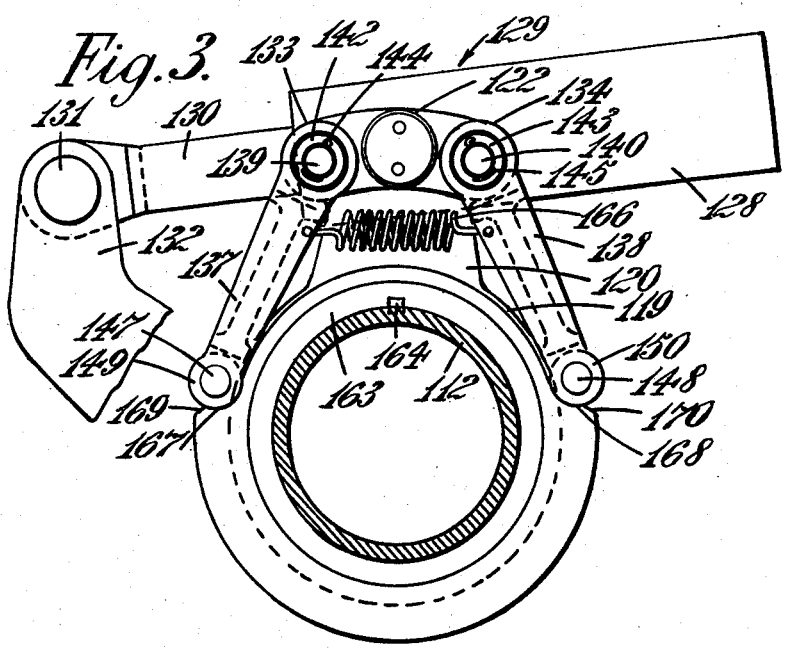
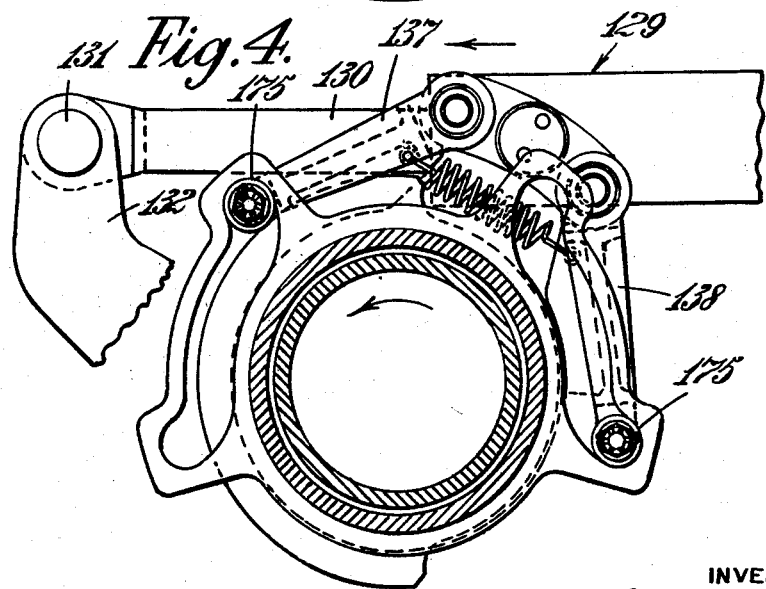
INVENTORS
GEORGE ORLOFF
ROBERT ROY
BERNARD E. COOPER
KENNETH T. P. LANGDON
By
Watson, Cole, Grindle & Watson
ATTORNEYS

2,943,819
AIRCRAFT UNDERCARRIAGE

George Orloff, Robert Roy, Bernard Edward Cooper, and Kenneth Thomas Peers Langdon, Gloucester, England, assignors to British Messier Limited, Gloucester, England, a British company Filed July 18, 1956, Ser. No. 598,607

Claims priority, application Great Britain July 20, 1955

2 Claims. (Cl. 244—50)

This invention comprises improvements in or relating to aircraft undercarriages.

More particularly the invention relates to steerable undercarriages of the kind in which one or more landing wheels are mounted on a rotatable steering member or leg supported by a fixed element secured to the aircraft, the range of angular displacement of the leg being limited by stop means and the steering movement being effected within said range by driving means operable from within the aircraft. In this context the expression "stop means" is not limited to positive stops deliberately provided for arresting the angular movement but is also inclusive of any bar to unlimited rotation of the leg which is inherent in the nature of the driving connections to the leg.

It is known to employ such an undercarriage in which the means for effecting the steering movements comprise an hydraulic jack controlled from within the aircraft. It is an object of the present invention to provide a construction of the kind described which is modified to render it more adaptable when used on an aircraft which is being towed on the ground.

The present invention comprises a steerable aircraft undercarriage of the kind described, wherein the stop means limiting the angular movement of the leg are such as to be capable of being disconnected from the leg or otherwise rendered inoperable, and means are provided for so disconnecting or rendering inoperable the stop means when the aircraft is to be moved on the ground other than under its own power.

The stop means limiting the angular movement of the leg may occur in the driving means for rotating the leg, and means may be provided for disconnecting the driving means and thereby also rendering the stop means inoperable on the leg, when the aircraft is to be moved on the ground other than under its own power.

When a vehicle is used to tow the aircraft along the ground therefore, the angle of steering movement of the undercarriage may be unlimited, whereas when the aircraft is propelling itself over the ground it is limited to an angle within the range afforded by the stop means, which angle is chosen so as to be within safe limits.

One specific example of construction according to the invention will now be described with reference to the accompanying drawings, of which:

Figure 1 is a sectional side elevation of the steering connection and disconnecting mechanism according to the invention;

Figure 2 is a cross-sectional view along the line 2—2 in Figure 1;

Figure 3 is a cross-sectional view along the line 3—3 in Figure 1;

Figure 4 is a cross-sectional view along the line 4—4 in Figure 1 but showing the mechanism in the disconnected position.

In the embodiment of the invention shown in the drawings, the nose wheel leg of a steerable nose wheel assembly for aircraft comprises an outer casing 111 of annular cross-section which is non-rotatable, being fixed with respect to the airframe, and an inner relatively rotatable casing 112 also of annular cross-section, which is supported partly within and coaxial with the outer casing by means of suitable bearings, one of which is shown at 113. Means for retaining the inner casing therein in the axial direction are provided but are not shown. The inner casing 112 extends from the outer casing and at its extremity carries the aircraft nose wheel, together with shock-absorbing means not shown. A short distance away from the end of the outer casing 111 the inner casing 112 is on its outer surface stepped at 114 to a slightly larger diameter part 115, and is further stepped at 116 to a still larger diameter part 117. This part is stepped down again at 118 to a diameter equivalent to that of part 115. Loosely mounted upon part 115 of the inner casing is an annular member 119 provided with a pair of forked flanges 120, 121 extending radially outwardly therefrom. As shown in Figure 1 a boss 122 is provided centrally on each of these flanges and this is provided with a tapped hole 123 therethrough, the axis of this hole lying parallel with the axis of the inner and outer casings. A suitable bolt 124 is screwed into each tapped hole and a spigot 125 on the end of each bolt projects into a hole 126, one hole drilled in each of two diametrically opposed lugs 127 integral with the external surface of the cylinder 128 of an hydraulic steering jack 129. In this way a pivotal connection is provided between the jack cylinder and the fork flanges 120 and 121. The jack rod 130 is pivotally connected at 131 to a flange 132 projecting from the outer casing 111. Flange 120 is further provided with bosses 133 and 134 disposed symmetrically on either side of the respective boss 122, such that they project from the flange. Both bosses are provided with a drilled hole 135 and 136, the axes of which are parallel to those of the tapped holes 123. As will be seen in Figure 1, two connecting rods 137 and 138 of "I" cross-section and forked at both ends are each at one end respectively pivotally connected at bosses 133 and 134 to the flange 120 by pins 139 and 140 which pass through holes 135 and 136 and holes as at 141 in the fork ends. These pins are retained by washers 142, 143 and split pins 144 and 145. The opposite forked end of each connecting rod is also provided with drilled holes as at 146 and pins 147 and 148 are provided in these holes so as to support rollers 149 and 150 between each pair of forks. The axes of these pins are disposed in a plane parallel to the axes of pins 139 and 140. Spacing washers 151 are provided on either side of each roller and the pins project from their respective connecting rods, being then provided with a washer as at 152, a second roller 153, 154 and a further washer 155, 156. Each pin assembly is retained with respect to its connecting rod by a castellated nut 157, 158 screwed onto a threaded extension 159, 160 of the respective pin and locked by means of split pin 161, 162. Rollers 149 and 150 normally (i.e. during steering) both engage a collar member 163 which is secured by a key 164 upon the inner casing 112 between the end of the outer casing 111 and the step 114, abutting against the step and the corresponding face of the annular member 119. Collar member 163 is provided with a peripheral projection 165 with which the rollers 149 and 150 are held in engagement by a coil spring 166 secured to, in convenient manner, and extending between, connecting rods 137 and 138. The peripheral projection is of greater diameter through an angle of about 190° than the remaining 170°, and steps 167 and 168 down to the lesser diameter part are of part circular configuration, the radius thereof approximating to that of rollers 149 and 150 so that these rollers may seat against these steps. A small chamfer 169, 170 is provided where the steps merge into the part of greater diameter. The end of the outer casing adjacent the collar member 163 is provided, integral therewith, with two outwardly extending radial flanges 171, 172 each extending peripherally through an angle of approximately 90° and disposed symmetrically about the outer casing 111 such that the greater part of each flange is disposed on the steering jack side of a line ZZ (see Figure 2). These flanges are provided with part-circumferential slots 173 and 174 having a width, and disposed in a radial plane, such that the rollers 153, 154 may respectively roll therein. At both ends each slot diverges outwardly and is provided with a semi-circular seating, as at 175, for the rollers.

The operation of this mechanism will now be described.

As in the first embodiment, when it is desired to steer the nose wheel, the servo valve means (not shown) associated with the steering jack 129 are operated to direct hydraulic fluid to either side of the jack piston to move the cylinder 128 in the desired direction. Such valve means may be of the follow-up type which automatically centralise to the neutral position when the jack cylinder moves to its new position. Now it will be appreciated that the arrangement of the jack and its driving connections to the rotary leg prevents the leg from rotating beyond certain angular limits for so long as the drive is coupled to the leg. These limits are however beyond the positions at which the means for disconnecting the drive come into operation, so that when the leg is subject to a torque applied externally of the aircraft it is able to rotate as far as these positions unhindered. These is also another pair of limits imposed on the leg rotation; these are the angular limits to which the leg is able to turn when being rotated through the driving connections under the control of the pilot. Since it is clear that to avoid untimely disconnection of the driving means, the leg when being rotated under the pilot's control must not reach as far round as the positions at which disconnection takes place, this further pair of limits is well within the range of said positions. To fix said further pair of limits, a cam upon the pilot's control member (not shown) operates a microswitch connected with a limiting valve in the pressure line to the servo valve means controlling the jack, and when the pilot's control is moved far enough in either direction to bring the leg round to the limit to which it can be allowed to rotate under these circumstances, the cam and micro-switch co-operate to operate said limiting valve and shut off the pressure supply motivating the jack. As before, the limits to which the leg turns when rotated by the jack under the pilot's control are well within the range of the positions at which disconnection of the driving connections from the jack takes place, although the leg can move beyond said positions under an externally-applied torque.

Let us assume that the inner casing 112 is positioned angularly within the steering range, which may be of the order of ±35° from the straight ahead position. Operation of the steering jack 129 results in movement of the jack cylinder in one direction or the other so that the annular member 119 turns either in the clockwise or anti-clockwise direction by virtue of the pivotal connection between its flanges 120, 121 and the cylinder 128. Consequently the connecting rods 137 and 138 and rollers 149 and 150 which are held engaged with the steps 167 and 168 by coil spring 166, are moved accordingly so that roller 149 or roller 150 is urged against its associated step 167 or 168 depending on the direction of rotation, and the collar member 163 together with the inner casing 112 and nose wheel are turned in either the clockwise or anti-clockwise direction, as the case may be.

As previously stated, when it is required to tow the aircraft it is desirable that the nose wheel and inner casing 112 should be capable of free rotational movement so that ground manoeuvring is facilitated. Accordingly a towing arm is at one end attached to a suitable projection (not shown) on the rotatable inner casing 112. The nose wheel and inner casing may be rotated by manual movement of the towing arm, about the axis of the nose wheel leg, against the frictional resistance in the hydraulic steering jack 129, the valve mechanism thereof being in the neutral position, and against the frictional resistance between the type of the nose wheel and the ground. Assuming that this turning is in the clockwise direction as viewed in the drawings the step 167 on the collar member 163 is urged against roller 149 so that connecting rod 137, annular member 119 and connecting rod 138 also turn in a clockwise direction, the jack cylinder 128 therefore moving to the right in the drawings. Such turning is continued until each roller 153 and 154 moves outwardly against the effort of coil spring 166 into one or other of the divergent end seatings 175 of its associated part-circumferential slot 173, 174. In this way rollers 149 and 150 ride out of the part-circular seatings formed by steps 167 and 168 over the chamfers 169, 170 into a position clear of the larger diameter part of the collar member 163, so that the collar member and nose wheel may be rotated freely in the clockwise and the anti-clockwise directions by the towing arm. In this respect this construction differs from the first construction since once the steering jack cylinder is moved to the end of its stroke and the rollers are disengaged from the collar member, only movement of the cylinder in the opposite direction under hydraulic power will re-engage the steering linkage.

Figure 4 shows the mechanism in the disconnected position.

If when the mechanism is in the normal steering position the towing arm is instead moved so that the collar member 163 moves in the anti-clockwise direction, release of the rollers 149, and 150 from the collar member will occur when the jack cylinder reaches the other end of its stroke and when the rollers 153 and 154 move outwardly into the opposite divergent end parts of the part-circumferential slots 173 and 174. Similarly the collar member and nose wheel may then be rotated freely in the clockwise and the anti-clockwise directions by the towing arm, but to re-engage the steering linkage it is necessary to hydraulically operate the jack.

We claim:

1. An aircraft undercarriage leg comprising a fixed member, a driven member mounted for rotation in said fixed member, rotator means connected between said fixed and driven members for rotating said driven member relatively to said fixed member, a pair of operative connections between said rotator means and said driven member, each of which operative connections incorporates a first abutment and a second abutment cooperating with said first abutment, one of which abutments is connected to said rotator means and the other of which abutments is connected to said driven member, one of said pair of operative connections being provided for transmitting drive in each direction of rotation of said driven member relatively to said fixed member, said leg being characterized in that each of said operative connections comprises a detent arm angularly movable with respect to its second abutment, in that its first abutment is constituted by a roller rotatably carried by said detent arm and its second abutment is constituted by a step, and in that engaging and disengaging means are provided for holding said roller and step positively in engagement and for positively moving said roller and step out of engagement in dependence upon the relative angular positions of said fixed and driven members, said engaging and disengaging means comprising a cam track nonrotatably connected to said fixed member and a cam follower connected to said detent arm to move it angularly.

2. An aircraft undercarriage leg comprising a fixed member, a driven member mounted for rotation in said fixed member, rotator means connected between said fixed and driven members for rotating said driven member relatively to said fixed member, a pair of operative connections between said rotator means and said driven member, each of which operative connections incorporates a first abutment and a second abutment cooporating with said first abutment, one of which abutments is connected to said rotator means and the other of which abutments is connected to said driven member, one of said pair of operative connections being provided for transmitting drive in each direction of rotation of said driven member relatively to said fixed member, said leg being characterized in that each of said operative connections comprises a detent arm angularly movable with respect to its second abutment, in that its first abutment is constituted by a roller rotatably carried by said detent arm and its second abutment is constituted by a step, and in that means are provided for holding said roller and step positively in engagement and for positively moving said roller and step out of engagement in dependence upon the relative angular positions of said fixed and driven members, said rotatable member having connected thereto a cam fixed against rotation relative to said rotatable member, said cam having a first cam surface part thereof concentric with said rotatable member and a second cam surface part also concentric with said rotatable member and of larger radius than said first part, and connecting cam surface parts connecting said first cam surface part with said second cam surface part, each said step being formed by one of said connecting cam surface parts, and in which each said detent arm is pivoted at one end thereof to said rotator means and carries said roller, which cooperates with said cam at its other end.

References Cited in the file of this patent
FOREIGN PATENTS 993,036   France ------------------ July 18, 1951